(12) United States Patent
Trøite et al.

(10) Patent No.: US 9,086,504 B2
(45) Date of Patent: Jul. 21, 2015

(54) ASYNCHRONOUS DS-CDMA RECEIVER

(75) Inventors: Torgeir Anderssen Trøite, Trondheim (NO); Dean Taylor Lehner, Katy, TX (US); Stian Lundli, Flatåsen (NO); Michael Walter Jahn, Porter, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 575 days.

(21) Appl. No.: 13/487,453

(22) Filed: Jun. 4, 2012

(65) Prior Publication Data
US 2013/0321164 A1    Dec. 5, 2013

(51) Int. Cl.
*G01V 3/18*      (2006.01)
*G01V 3/34*      (2006.01)
*E21B 47/01*     (2012.01)

(52) U.S. Cl.
CPC . *G01V 3/34* (2013.01); *E21B 47/01* (2013.01); *G01V 3/18* (2013.01); *G01V 2200/16* (2013.01)

(58) Field of Classification Search
CPC ....... E21B 47/01; E21B 47/12; E21B 47/122; G01V 3/18; G01V 3/24; G01V 2200/16
USPC ........................................ 340/853.3; 370/441
See application file for complete search history.

(56) References Cited

U.S. PATENT DOCUMENTS

| | | | |
|---|---|---|---|
| 3,925,749 A | 12/1975 | McLaughlin et al. | |
| 6,507,876 B1 | 1/2003 | Fukuta | |
| 6,819,260 B2 * | 11/2004 | Gardner et al. | 340/855.5 |
| 7,061,932 B2 * | 6/2006 | Gardner et al. | 370/441 |
| 7,224,289 B2 * | 5/2007 | Bausov et al. | 340/854.8 |
| 7,248,178 B2 * | 7/2007 | Layton | 340/854.9 |
| 7,932,834 B2 | 4/2011 | Beique et al. | |
| 2002/0141487 A1 * | 10/2002 | Bradley | 375/148 |
| 2003/0006906 A1 * | 1/2003 | Gardner et al. | 340/853.3 |
| 2005/0110655 A1 * | 5/2005 | Layton | 340/854.9 |
| 2010/0200743 A1 | 8/2010 | Forster et al. | |
| 2011/0149692 A1 | 6/2011 | Collette | |

FOREIGN PATENT DOCUMENTS

| | | |
|---|---|---|
| EP | 1335105 A2 | 8/2003 |
| GB | 2411917 B | 3/2008 |

OTHER PUBLICATIONS

European Search Report dated Nov. 21, 2013, issued by the Intellectual Property Office of Great Britain, in Application No. GB1309910.6.

* cited by examiner

*Primary Examiner* — Albert Wong
(74) *Attorney, Agent, or Firm* — Patterson & Sheridan, LLP (57) ABSTRACT

Methods, apparatus, and systems are provided for collecting data from a plurality of downhole sensors located in a wellbore utilizing an asynchronous direct-sequence code division multiple access (DS-CDMA)-based communication scheme. One example method includes receiving a superposed signal comprising asynchronous signals from the downhole sensors, wherein a spreading sequence has been applied to data generated by each of the downhole sensors to form each of the asynchronous signals; sampling the received superposed signal; and processing the sampled superposed signal using decorrelation to determine the data from at least one of the downhole sensors before the spreading sequence was applied.

16 Claims, 14 Drawing Sheets

$$y = \begin{bmatrix} y[-2] \\ y[-1] \\ y[0] \\ y[1] \\ y[2] \end{bmatrix} \quad R = \begin{bmatrix} R[0] & R^T[1] & 0 & 0 & 0 \\ R[1] & R[0] & R^T[1] & 0 & 0 \\ 0 & R[1] & R[0] & R^T[1] & 0 \\ 0 & 0 & R[1] & R[0] & R^T[1] \\ 0 & 0 & 0 & R[1] & R[0] \end{bmatrix}$$

FIG. 10

| Correlation matrix update rate | | |
|---|---|---|
| Parameter | Value | Unit |
| Individual oscillator offset +/- | 70 | ppm |
| Symbol clock drift | 140 | us / s |
| Sample rate | 20 | kHz |
| Sample period (=delay resolution) | 50 | us |
| Correlation matrix update rate | 3 | Hz |

FIG. 11A

| Correlation matrix size | |
|---|---|
| Parameter | Value |
| Number of users (K) | 16 |
| Decorrelator block size (W) | 7 |
| Correlator matrix size (WK x WK) | 112 |

| Packet format | | |
|---|---|---|
| Byte | Name | Description |
| 0 | SYNC | Very long spreading sequence for timing estimation |
| 1 | PRESSURE[7..0] | Signed two's complement fixed-point pressure |
| 2 | PRESSURE[15..8] | |
| 3 | TEMPERATURE[7..0] | Signed two's complement fixed-point temperature |
| 4 | TEMPERATURE[15..8] | |
| 5 | STATUS[7..0] | Gauge status register (voltage, id, etc) |
| 6 | STATUS[15..8] | |
| 7 | reserved | |
| 8 | reserved | |
| 9 | CRC/FEC | CRC-8-ATM (x8 + x2 + x + 1) |

ASYNCHRONOUS DS-CDMA RECEIVER

BACKGROUND OF THE INVENTION

1. Field of the Invention

Embodiments of the present invention generally relate to downhole sensing and, more particularly, to collecting data from sensors located in a wellbore utilizing an asynchronous direct-sequence code division multiple access (DS-CDMA)-based communication scheme.

2. Description of the Related Art

Permanent monitoring systems in a wellbore that utilize sensors (e.g., quartz pressure/temperature (P/T) gauges) may provide pressure and temperature measurements by using a quartz resonator as the transducer to gather data that enables production optimization and reservoir management decisions.

A plurality of the sensors deployed in a wellbore may transmit signals indicating downhole conditions to a receiver located, for example, at a surface. Processing these signals at the receiver may be possible by each sensor having its own communication channel (e.g., wire) for transmitting a signal to the receiver. However, with more than a few sensors deployed in the wellbore, the cable involved for providing the multiple communication channels may be quite large. Therefore, there is a need for processing signals received from a plurality of sensors via a single communication channel.

SUMMARY OF THE INVENTION

One embodiment of the present invention is a method for downhole sensing. The method generally includes receiving a superposed signal comprising asynchronous signals from a plurality of downhole sensors located in a wellbore, wherein a spreading sequence has been applied to data generated by each of the downhole sensors to form each of the asynchronous signals; sampling the received superposed signal; and processing the sampled superposed signal using decorrelation to determine the data from at least one of the downhole sensors before the spreading sequence was applied.

Another embodiment of the present invention is a system for downhole sensing. The system generally includes a plurality of downhole sensors located in a wellbore and at least one processor. The processor is typically configured to receive a superposed signal comprising asynchronous signals from the plurality of downhole sensors, wherein a spreading sequence has been applied to data generated by each of the downhole sensors to form each of the asynchronous signals; to sample the received superposed signal; and to process the sampled superposed signal using decorrelation to determine the data from at least one of the downhole sensors before the spreading sequence was applied.

Another embodiment of the present invention is an apparatus for downhole sensing. The apparatus generally includes a receiver configured to receive a superposed signal comprising asynchronous signals from a plurality of downhole sensors located in a wellbore, wherein a spreading sequence has been applied to data generated by each of the downhole sensors to form each of the asynchronous signals; an analog-to-digital converter (ADC) configured to sample the received superposed signal; and a processing unit configured to process the sampled superposed signal using decorrelation to determine the data from at least one of the downhole sensors before the spreading sequence was applied.

Another embodiment of the present invention is a computer-readable medium containing a program which, when executed by a processor, performs operations. The operations generally include receiving a superposed signal comprising asynchronous signals from a plurality of downhole sensors located in a wellbore, wherein a spreading sequence has been applied to data generated by each of the downhole sensors to form each of the asynchronous signals; sampling the received superposed signal; and processing the sampled superposed signal using decorrelation to determine the data from at least one of the downhole sensors before the spreading sequence was applied.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide methods and apparatus for collecting data from sensors located in a wellbore utilizing an asynchronous direct-sequence code division multiple access (DS-CDMA)-based communication scheme.

Figure 1:
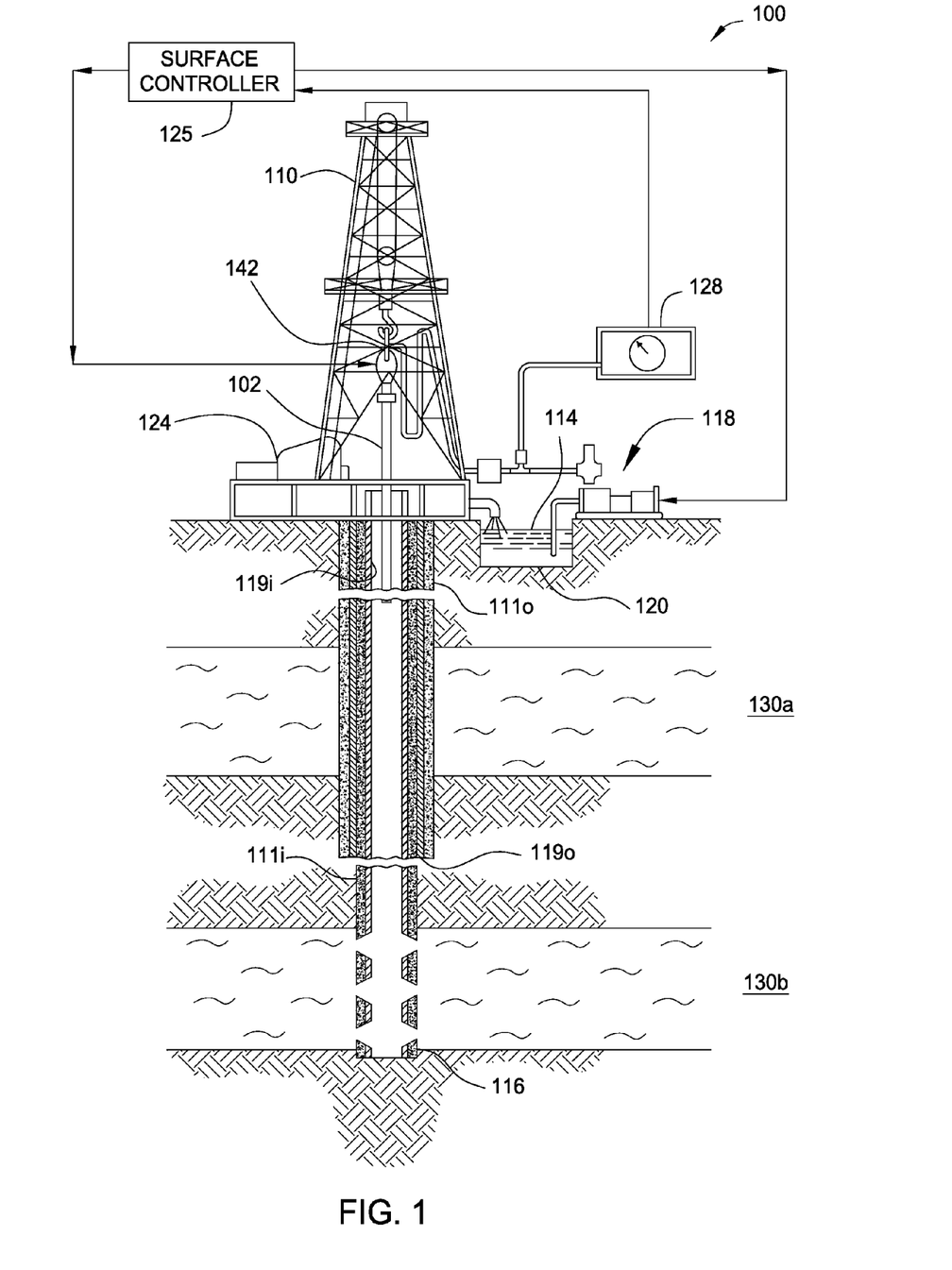
FIG. 1 illustrates a drilling system, according to an embodiment of the present invention.

FIG. 1 illustrates a drilling system 100, according to an embodiment of the present invention. The drilling system 100 may include a derrick 110. The drilling system 100 may further include drawworks 124 for supporting, for example, a top drive 142. A workstring 102 may comprise joints of threaded drill pipe connected together, coiled tubing, or casing. For some embodiments, the top drive 142 may be omitted (e.g., if the workstring 102 is coiled tubing). A rig pump 118 may pump drilling fluid, such as mud 114, out of a pit 120, passing the mud through a stand pipe and Kelly hose to the top drive 142. The mud 114 may continue into the workstring 102. The drilling fluid and cuttings, collectively returns, may flow upward along an annulus formed between the workstring and one of the casings 119$i,o$, through a solids treatment system (not shown) where the cuttings may be separated. The treated drilling fluid may then be discharged to the mud pit 120 for recirculation. A surface controller 125 may be in data communication with the rig pump 118, pressure sensor 128, and top drive 142.

After a first section of a wellbore 116 has been drilled, an outer casing string 119$o$ may be installed in the wellbore 116 and cemented 111$o$ in place. The outer casing string 119$o$ may isolate a fluid bearing formation, such as aquifer 130$a$, from further drilling and later production. Alternatively, fluid bearing formation 130$a$ may instead be hydrocarbon bearing and may have been previously produced to depletion or ignored due to lack of adequate capacity. After a second section of the wellbore 116 has been drilled, an inner casing string 119$i$ may be installed in the wellbore 116 and cemented 111$i$ in place. The inner casing string 119$i$ may be perforated and hydrocarbon bearing formation 130$b$ may be produced, such as by installation of production tubing (not shown) and a production packer.

As described above, a plurality of sensors (e.g., quartz gauges having a quartz resonator as the transducer) may be deployed within the wellbore 116 for detecting downhole conditions (e.g., temperature and pressure). For some embodiments, the sensors may broadcast their measurement data on the same communication channel (e.g., a single conductor) to a receiver located, for example, at the surface. There is a need for processing these signals received via the single communication channel.

Figure 2:
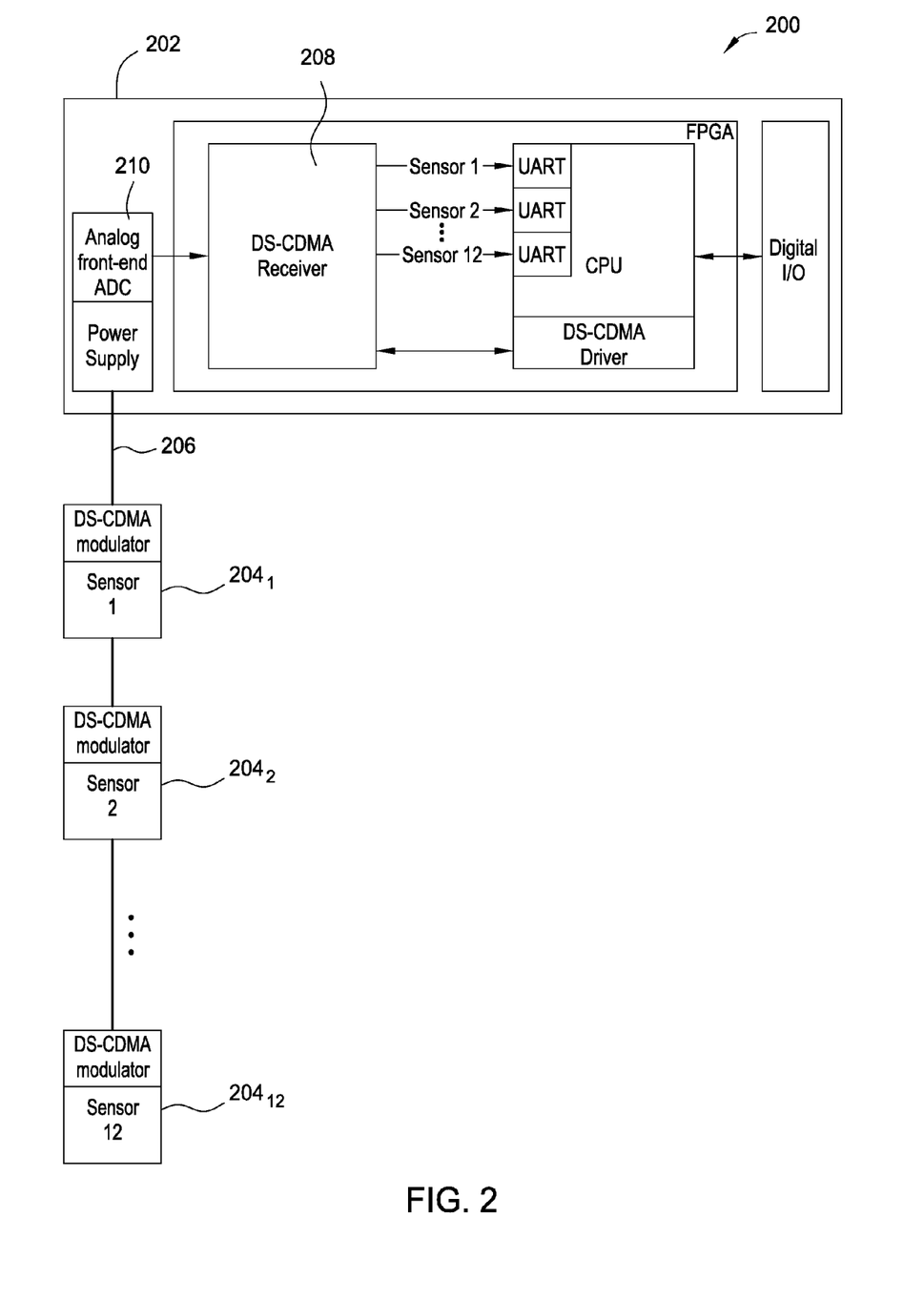
FIG. 2 illustrates a block diagram of a system with a processing device utilizing an asynchronous direct-sequence code division multiple access (DS-CDMA)-based communication scheme for receiving signals from a plurality of downhole sensors located in a wellbore, according to an embodiment of the present invention.

FIG. 2 illustrates a block diagram of a system 200 with a processing device 202 utilizing an asynchronous direct-sequence code division multiple access (DS-CDMA)-based communication scheme for receiving signals from a plurality of downhole sensors 204 (e.g., quartz gauges) located in a wellbore, according to an embodiment of the present invention. The processing device 202 may be implemented in a field-programmable gate array (FPGA) or digital signal processor (DSP), or any of other various suitable processing units. The device 202 generally includes an asynchronous DS-CDMA receiver 208 for processing the signals received from the plurality of sensors 204. An analog-to-digital converter (ADC) 210 may sample and convert the analog signals received from the downhole sensors 204 to a digital representation suitable for complex signal processing. The system 200 generally involves simplex communications, where multiple sensors 204 may broadcast their measurement data on the same conductor (e.g., the same electrical wire within cable 206), and the device 202 may receive the sum of signals from all the sensors 204 (i.e., superposition). One example of a downhole sensor 204 is a quartz transducer for measuring downhole conditions, such as temperature and pressure.

Figure 3:
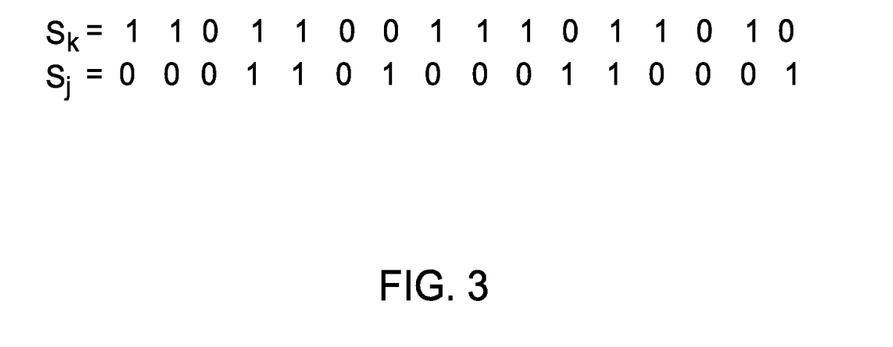
FIG. 3 illustrates two examples of 16-bit spreading sequences, according to an embodiment of the present invention.
Figure 4:
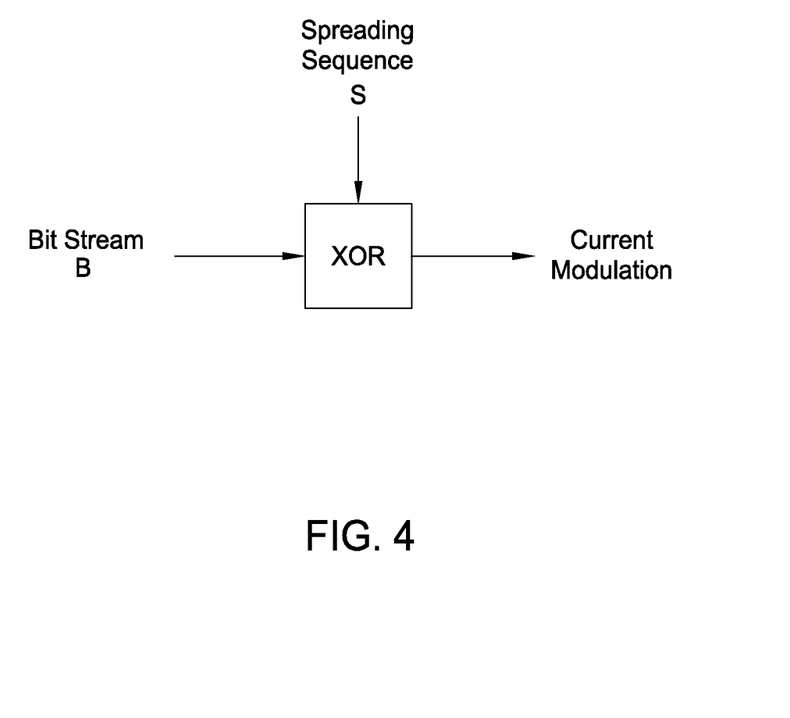
FIG. 4 illustrates a spreading sequence associated with a sensor applied to each data bit transmitted by the sensor, according to an embodiment of the present invention.

Each sensor 204 may have its own unique spreading sequence, according to the DS-CDMA-based communication scheme. FIG. 3 illustrates two examples of 16-bit spreading sequences, according to an embodiment of the present invention. The spreading sequences may be designed to have low cross correlation. For some embodiments, the length of the sequences may be as long as possible to increase the processing gain. For example, a spreading sequence having a length of 32, 48, or 64 bits may be implemented. However, the length may be limited by the available bandwidth in the channel. When transmitting a signal from a sensor 204, the spreading sequence s associated with the sensor 204 may be applied (e.g., using a logical XOR) to each data bit b transmitted, as illustrated in FIG. 4.

Figure 5:
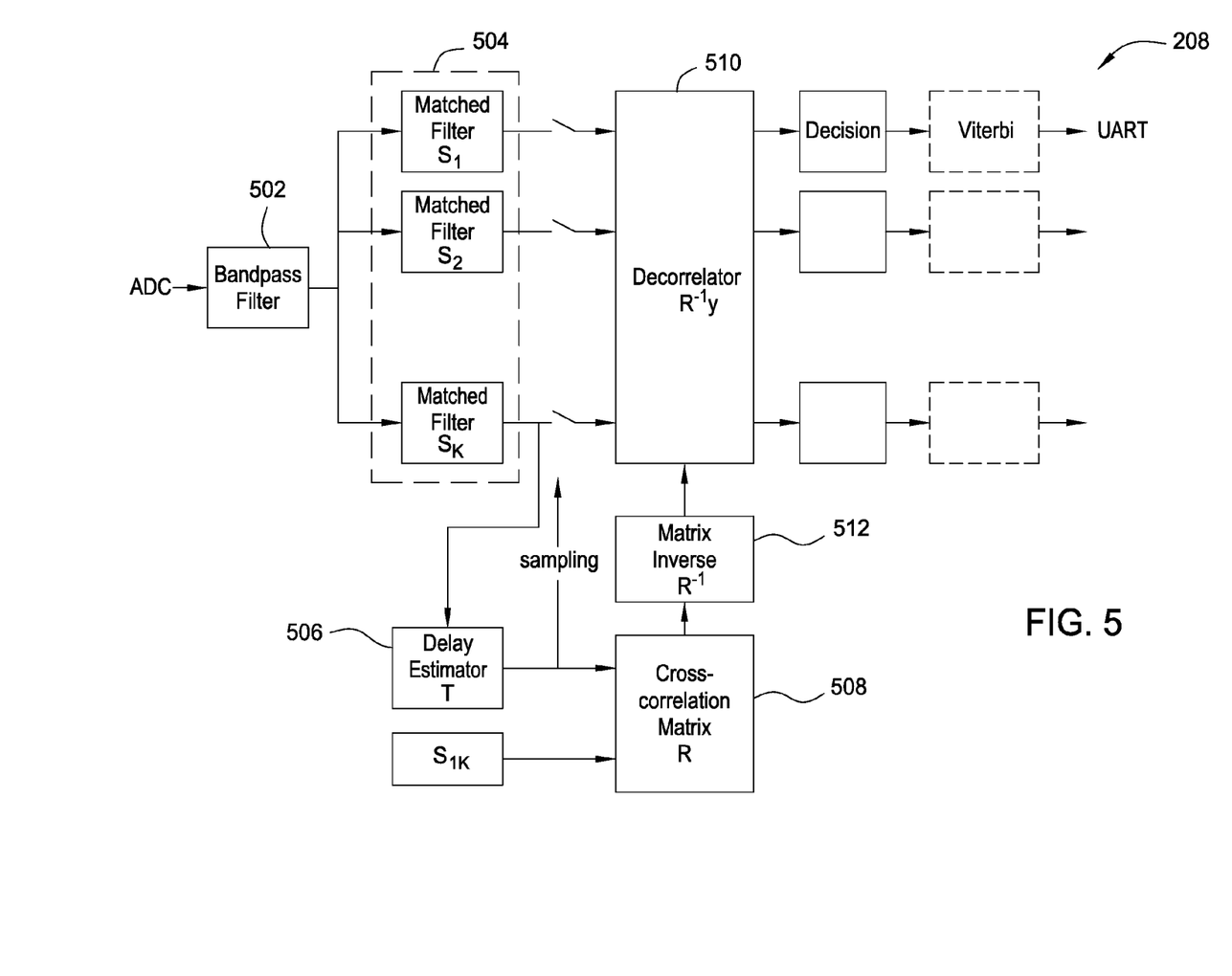
FIG. 5 illustrates a block diagram of an asynchronous DS-CDMA receiver, according to an embodiment of the present invention.

FIG. 5 illustrates a block diagram of an asynchronous DS-CDMA receiver 208, according to an embodiment of the present invention. The receiver 208 may include a bandpass filter 502, a matched filter bank 504, a delay estimator 506, a correlation matrix calculator 508 (e.g., with inverse or QR-decomposition), and a decorrelator 510. QR-decomposition involves a decomposition of a matrix A into a product (A=QR) of an orthogonal matrix Q and an upper triangular matrix R. The bandpass filter 502 may remove DC offsets introduced by the ADC 210 and other analog front-end components. The bandpass filter 502 may also restrict an over-sampled ADC signal frequency content to the Nyquist frequency.

Figure 6:
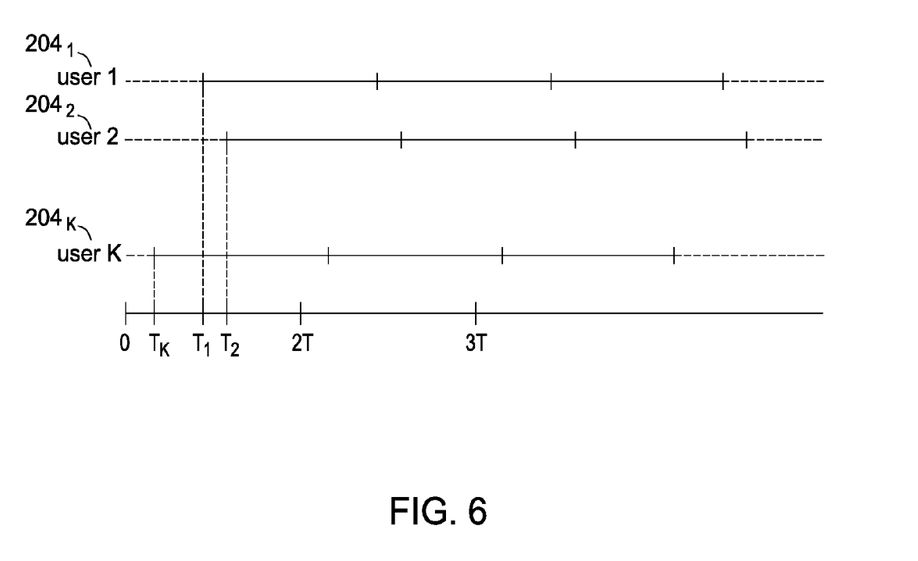
FIG. 6 illustrates an asynchronous DS-CDMA receiver timing diagram, according to an embodiment of the present invention.
Figure 7:
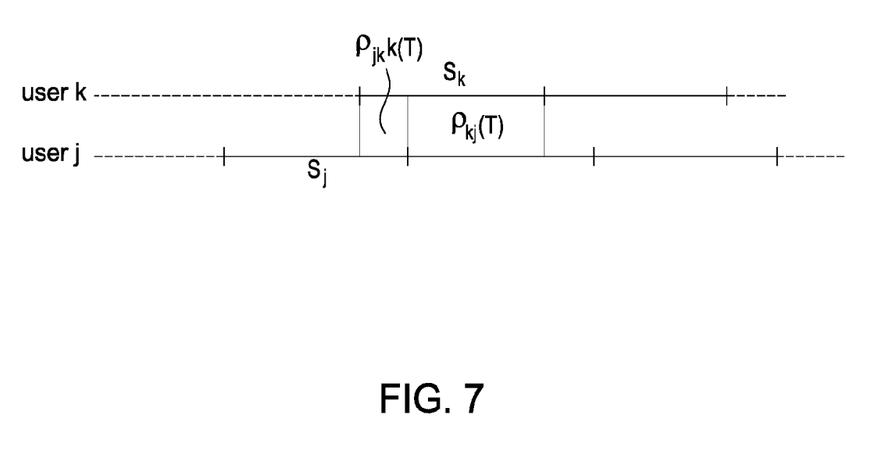
FIG. 7 illustrates a definition of cross correlation coefficients between two spreading sequences, according to an embodiment of the present invention.

The data bits from each sensor 204 may arrive at the device 202 asynchronously (i.e., at different times without being synchronized with a system clock), as illustrated in FIG. 6. For example, data bits from sensor $204_1$ may arrive at the device 202 at time $T_1$, data bits from sensor $204_2$ may arrive at the device 202 at time $T_2$, and data bits from sensor $204_K$ may arrive at the device 202 at time $T_K$. In an asynchronous model, the cross correlation between two spreading sequences may be defined as two coefficients: one for each overlap area ($\rho_{kj}$ and $\rho_{jk}$), as illustrated in FIG. 7. For example, $$\rho_{kj} = \int_\tau^T s_k(t)s_j(t-\tau)dt \text{ and}$$

$$\rho_{jk} = \int_0^T s_k(t)s_j(t+T-\tau)dt.$$

Figure 8:
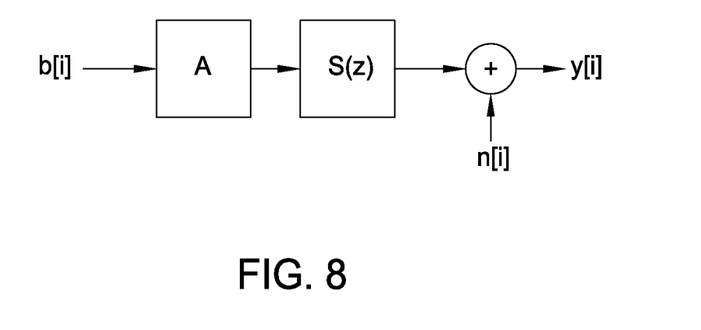
FIG. 8 illustrates a z-transform domain model of a matched filter output, according to an embodiment of the present invention.

The number of matched filters in the matched filter bank 504 may correspond to the number of sensors 204. In other words, each matched filter may correspond to the spreading sequence of an associated sensor 204. Therefore, the matched filter may detect the spreading sequence transmitted in a signal from the associated sensor 204 by correlating the known spreading sequence with the superposed signal transmitted from the plurality of sensors 204. Upon detecting the spreading sequence, the original signal transmitted from the associated sensor may be determined (described below). The output of the matched filter may be modeled as illustrated in FIG. 8, where $y=SAb+n$ and $S(z)=R^T[1]z+R[0]+R[1]z^{-1}$, where A is the amplitude, b is the transmitted bits, n is noise, and R is the correlation matrix.

Figure 9:
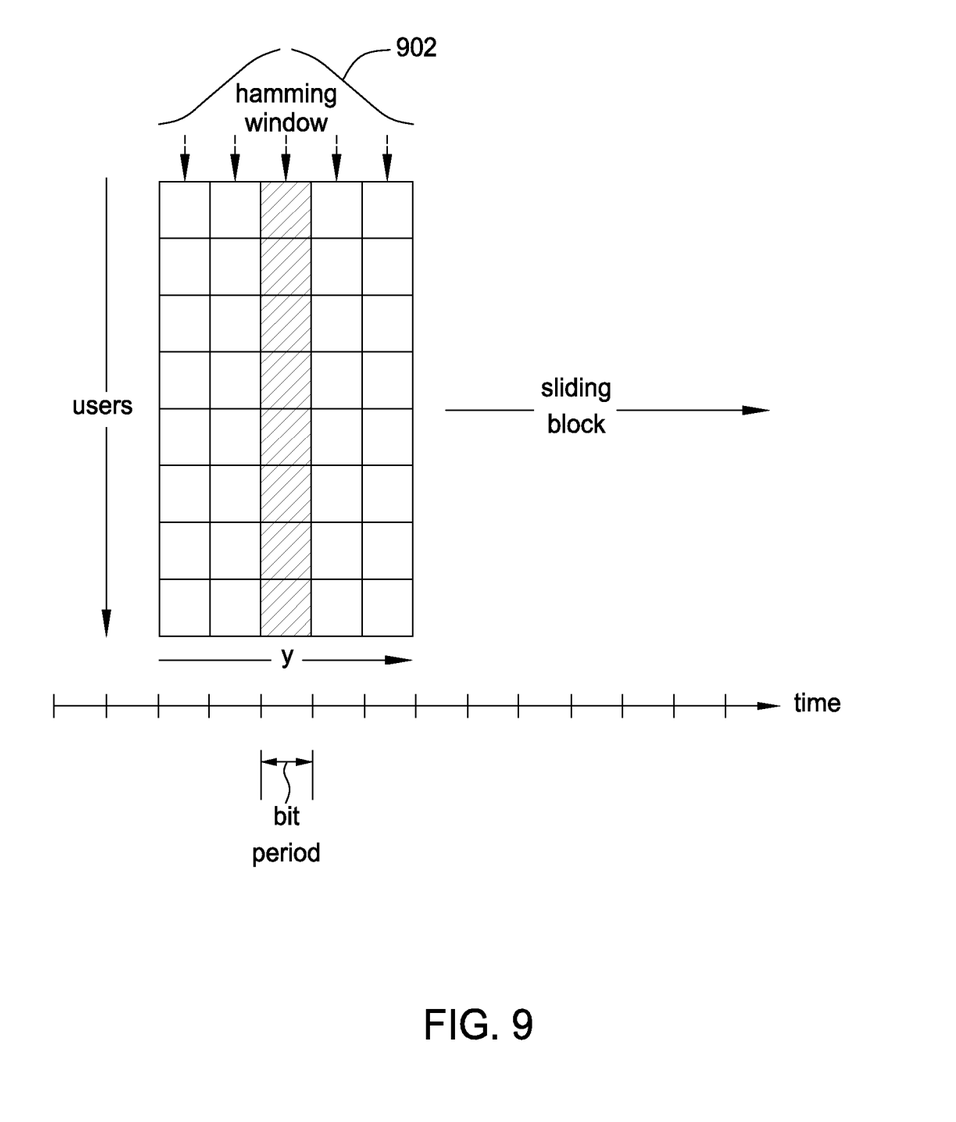
FIG. 9 illustrates a matched filter sliding Hamming-windowed block output, according to an embodiment of the present invention.
Figure 10:
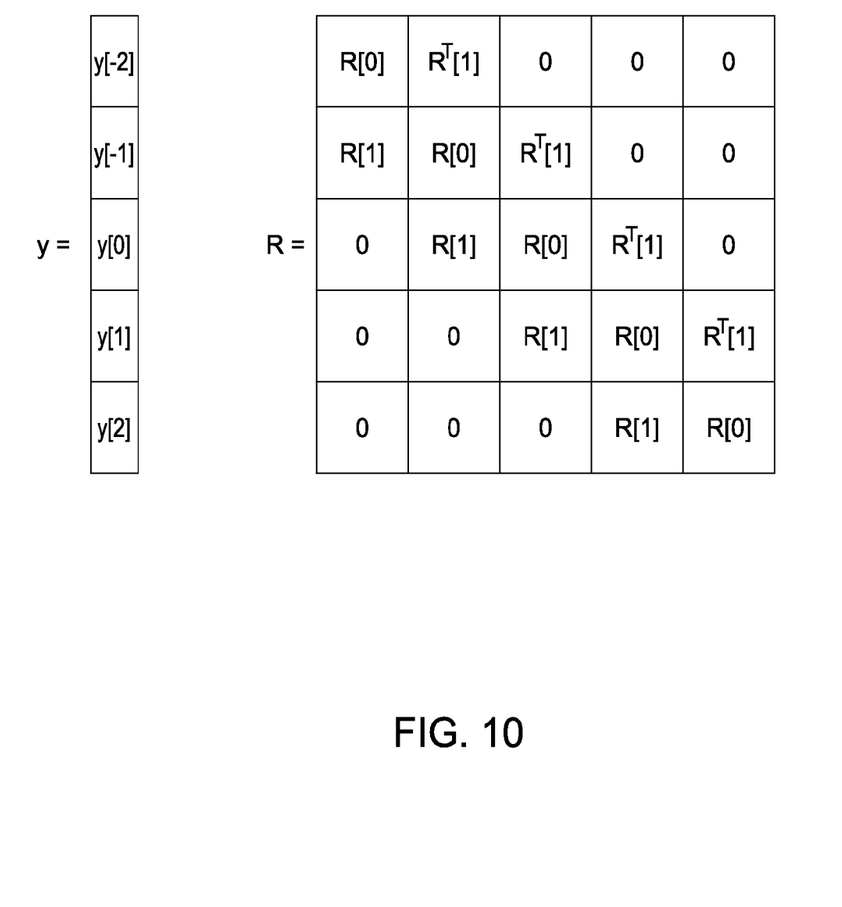
FIG. 10 illustrates a block correlation matrix R and a concatenated matched filter output y, according to an embodiment of the present invention.

In an asynchronous model, every bit from the output of a matched filter may be affected by all other bits from all other users in the superposed signal received from the plurality of sensors 204. In a system that runs continuously, it may not be possible to process the received signal. However, bits far from the current bit under consideration may have negligible impact on the current bit. Therefore, instead of observing the entire superposed signal received from the plurality of sensors 204, the receiver 208 may consider only a block of matched filter output samples. For certain embodiments, a Hamming-window 902 may be applied to the data in the block to minimize, or at least reduce, the edge effects, as illustrated in FIG. 9. A large correlation matrix R, illustrated in FIG. 10, may be constructed based on the delay:

$$R_{jk}[m] = \int_{-\infty}^{\infty} s_j(t-\tau_j)s_k(t+mT-\tau_k)dt.$$

The decorrelator 510 may use the inverse of R (i.e., $R^{-1}$) to solve for b. This inversion may be performed by the matrix inverter 512 shown in FIG. 5. The block outputs y of the matched filters may be described as:

$y=ARb+n.$

The decorrelator 510 may solve these sets of equation to find b:

$b=yR^{-1}.$

Since the sensors 204 have asynchronous clocks, the relative arrival time T of the bits from each sensor 204 may change over time. When the relative timing between bits change, the cross correlation may change, and thus the cross correlation matrix and the decorrelator matrix may also change. For some embodiments, the calculation of the decorrelator matrix generally includes an inversion of a matrix (or other equivalent methods). This calculation may require large amounts of memory and processing time and, therefore, updating of the correlation matrix may be limited according to certain embodiments.

Figure 11A:
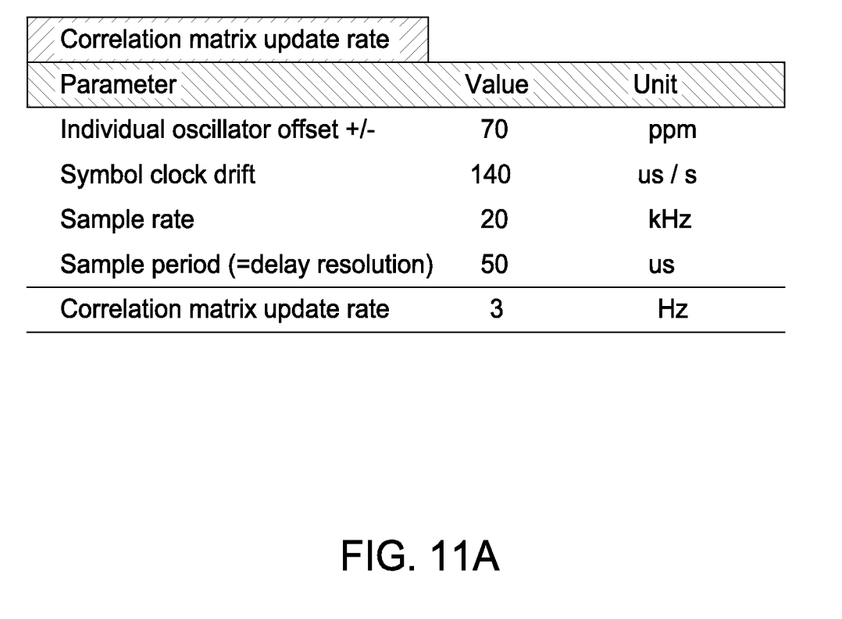
FIG. 11A is a table illustrating how often the correlation matrix may be updated as a function of an oscillator offset and sample rate, according to an embodiment of the present invention.
Figure 11B:
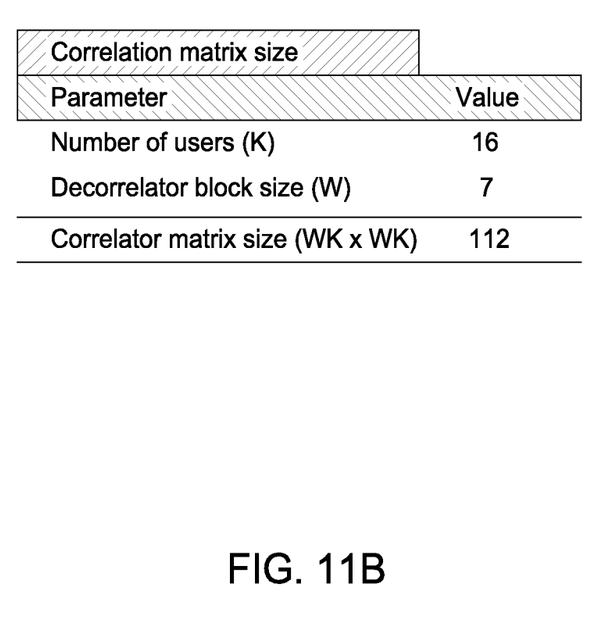
FIG. 11B is a table illustrating the size of a correlation matrix, according to an embodiment of the present invention.

FIG. 11A illustrates how often the correlation matrix may be updated as a function of the oscillator offset and sample rate, according to an embodiment of the present invention. The size of the correlation matrix may depend on the number of users (e.g., sensors 204) and the size of the decorrelator block. As an example, for a system with sixteen sensors 204 and a decorrelator block size of seven, the correlator matrix size may be 112, as illustrated in FIG. 11B. A QR decomposition may be used to find the solution to a set of linear equations. Together with a coordinate rotation digital computer (CORDIC) algorithm, it may be possible to solve for the correlation matrix within the desired time using an FPGA.

Figure 12:
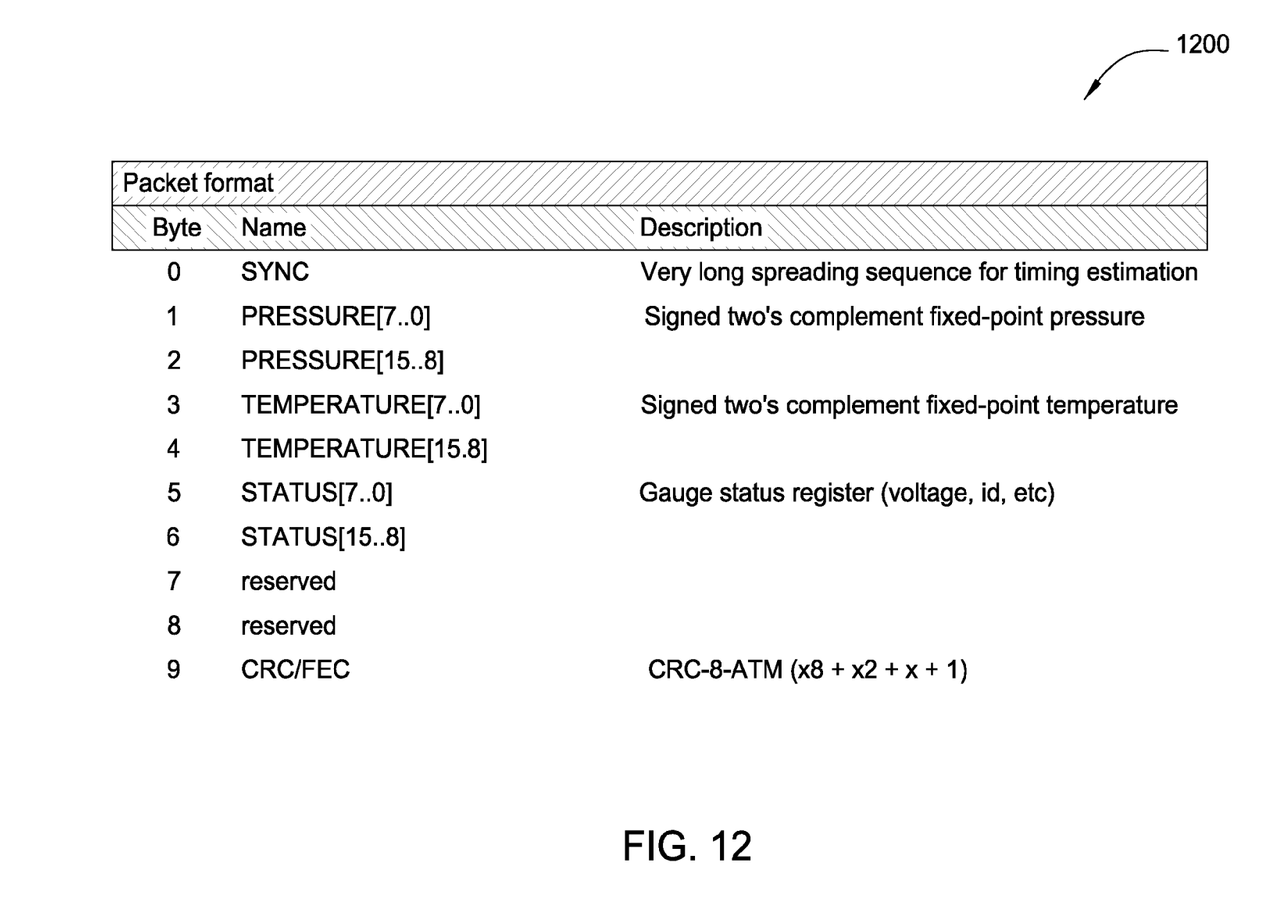
FIG. 12 illustrates an example of a sensor packet format, according to an embodiment of the present invention.

The decorrelation of the matched filter output may entail knowledge of the relative delays between the sensors 204. These delays may vary slowly and in a predictable manner. In the existing packet format, the first byte may be a synchronization byte. For some embodiments, this synchronization byte may be replaced with a long spreading sequence, as illustrated by a typical sensor packet format 1200 in FIG. 12. For example, the spreading sequence may be 8 times (or more) longer than the normal bit spreading sequence. Since this synchronization sequence may be transmitted only once per second, it may not occupy more than typically 5-10% of the packet, but it may increase the accuracy of the delay estimation significantly. The drift in chips/seconds may be stable and may be measured over a larger time span to increase the accuracy of the delay estimates.

Figure 13:
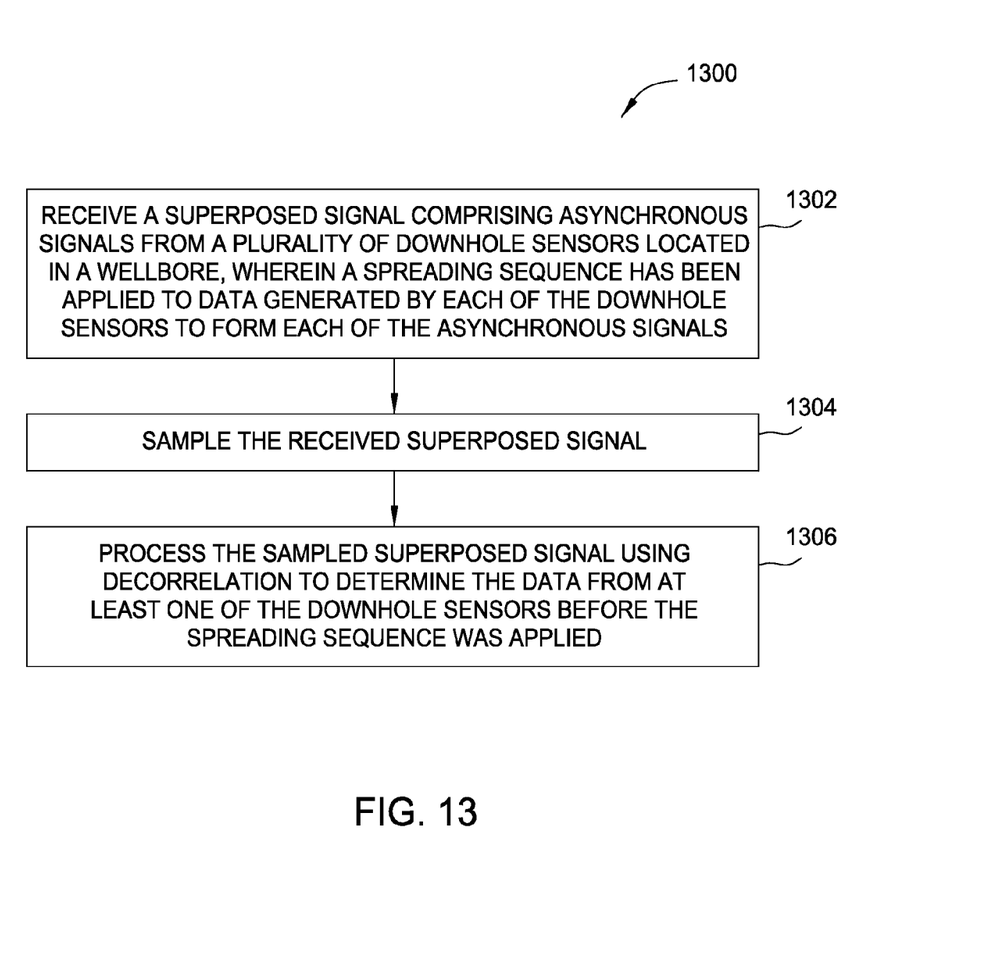
FIG. 13 illustrates example operations for collecting data from a plurality of downhole sensors located in a wellbore utilizing an asynchronous DS-CDMA-based communication scheme, according to an embodiment of the present invention.

FIG. 13 illustrates example operations 1300 for collecting data (e.g., by device 202) from a plurality of downhole sensors located in a wellbore utilizing an asynchronous DS-CDMA-based communication scheme, according to an embodiment of the present invention. The operations may begin at 1302 by receiving a superposed signal comprising asynchronous signals from the plurality of downhole sensors (e.g., via a single conductor), wherein a spreading sequence may have been applied to data generated by each of the downhole sensors to form each of the asynchronous signals. For some embodiments, each spreading sequence may be unique and have a low cross correlation. At 1304, the device 202 may sample the received superposed signal.

At 1306, the device 202 may process the sampled superposed signal using decorrelation to determine the data from at least one of the downhole sensors before the spreading sequence was applied. For some embodiments, processing the sampled superposed signal generally includes applying a plurality of matched filters to the sampled superposed signal, each of the matched filters based on a different spreading sequence. The device 202 may estimate a period of the asynchronous signals from the plurality of downhole sensors and sample outputs of the plurality of matched filters based on the estimated period. For some embodiments, the device 202 may generate a correlation matrix based on each spreading sequence and the estimated period, and invert the correlation matrix to generate a decorrelation matrix. Further, the device 202 may apply such a decorrelation matrix to a block of matched filter sampled outputs to determine the data. For some embodiments, the device 202 may apply a Hamming window to the samples in the block of matched filter sampled outputs.

While the foregoing is directed to embodiments of the present invention, other and further embodiments of the invention may be devised without departing from the basic scope thereof, and the scope thereof is determined by the claims that follow.

The invention claimed is:

1. A method for downhole sensing, comprising:
   receiving a superposed signal comprising asynchronous signals from a plurality of downhole sensors located in a well bore, wherein a spreading sequence has been applied to data generated by each of the downhole sensors to form each of the asynchronous signals;
   sampling the received superposed signal; and
   processing the sampled superposed signal using decorrelation to determine the data from at least one of the downhole sensors before the spreading sequence was applied, wherein processing the sampled superposed signal comprises:
   applying a plurality of matched filters to the sampled superposed signal, each of the matched filters based on a different spreading sequence;
   estimating a period of the asynchronous signals from the plurality of downhole sensors;
   sampling outputs of the plurality of matched filters based on the estimated period; and
   applying a decorrelation matrix to a block of matched filter sampled outputs to determine the data.

2. The method of claim 1, further comprising applying a Hamming window to the samples in the block of matched filter sampled outputs.

3. The method of claim 1, further comprising:
   generating a correlation matrix based on each spreading sequence and the estimated period; and
   inverting the correlation matrix to generate the decorrelation matrix.

4. The method of claim 1, wherein each spreading sequence is unique and has a low cross correlation.

5. The method of claim 1, wherein receiving the superposed signal comprises receiving the asynchronous signals from the plurality of downhole sensors via a single conductor.

6. A system for downhole sensing, comprising:
a plurality of downhole sensors located in a wellbore; and
at least one processor configured to:
receive a superposed signal comprising asynchronous signals from the plurality of downhole sensors, wherein a spreading sequence has been applied to data generated by each of the downhole sensors to form each of the asynchronous signals;
sample the received superposed signal; and
process the sampled superposed signal using decorrelation to determine the data from at least one of the downhole sensors before the spreading sequence was applied, wherein the processor is configured to process the sampled superposed signal by:
applying a plurality of matched filters to the sampled superposed signal, each of the matched filters based on a different spreading sequence;
estimating a period of the asynchronous signals from the plurality of downhole sensors;
sampling outputs of the plurality of matched filters based on the estimated period; and
applying a decorrelation matrix to a block of matched filter sampled outputs to determine the data.

7. The system of claim 6, further comprising a single conductor, wherein the processor is configured to receive the superposed signal by receiving the asynchronous signals from the plurality of downhole sensors via the single conductor.

8. The system of claim 6, wherein the processor is further configured to process the sampled superposed signal by applying a Hamming window to the samples in the block of matched filter sampled outputs.

9. The system of claim 6, wherein the processor is further configured to process the sampled superposed signal by:
generating a correlation matrix based on each spreading sequence and the estimated period; and
inverting the correlation matrix to generate the decorrelation matrix.

10. The system of claim 6, wherein each spreading sequence is unique and has a low cross correlation.

11. An apparatus for downhole sensing, comprising:
a receiver configured to receive a superposed signal comprising asynchronous signals from a plurality of downhole sensors located in a well bore, wherein a spreading sequence has been applied to data generated by each of the downhole sensors to form each of the asynchronous signals;
an analog-to-digital converter (ADC) configured to sample the received superposed signal; and
a processing unit configured to process the sampled superposed signal using decorrelation to determine the data from at least one of the downhole sensors before the spreading sequence was applied, wherein the processing unit is configured to process the sampled superposed signal by:
applying a plurality of matched filters to the sampled superposed signal, each of the matched filters based on a different spreading sequence;
estimating a period of the asynchronous signals from the plurality of downhole sensors;
sampling outputs of the plurality of matched filters based on the estimated period; and
applying a decorrelation matrix to a block of matched filter sampled outputs to determine the data.

12. The apparatus of claim 11, wherein the processing unit is further configured to process the sampled superposed signal by applying a Hamming window to the samples in the block of matched filter sampled outputs.

13. The apparatus of claim 11, wherein the processing unit is further configured to process the sampled superposed signal by:
generating a correlation matrix based on each spreading sequence and the estimated period; and
inverting the correlation matrix to generate the decorrelation matrix.

14. The apparatus of claim 11, wherein each spreading sequence is unique and has a low cross correlation.

15. The apparatus of claim 11, wherein the receiver is configured to receive the superposed signal by receiving the asynchronous signals from the plurality of downhole sensors via a single conductor.

16. A non-transitory computer-readable medium containing a program for downhole sensing, which when executed by a processor, performs operations comprising:
receiving a superposed signal comprising asynchronous signals from a plurality of downhole sensors located in a wellbore, wherein a spreading sequence has been applied to data generated by each of the downhole sensors to form each of the asynchronous signals;
sampling the received superposed signal; and
processing the sampled superposed signal using decorrelation to determine the data from at least one of the downhole sensors before the spreading sequence was applied, wherein processing the sampled superposed signal comprises:
applying a plurality of matched filters to the sampled superposed signal, each of the matched filters based on a different spreading sequence;
estimating a period of the asynchronous signals from the plurality of downhole sensors;
sampling outputs of the plurality of matched filters based on the estimated period; and
applying a decorrelation matrix to a block of matched filter sampled outputs to determine the data.

* * * * *